United States Patent
Roy et al.

(10) Patent No.: US 7,110,461 B2
(45) Date of Patent: Sep. 19, 2006

(54) TECHNIQUE TO ENLARGE DATA EYES IN WIRELINE COMMUNICATION SYSTEMS

(75) Inventors: Aninda K. Roy, San Jose, CA (US); Claude R. Gauthier, Fremont, CA (US); Brian W. Amick, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 785 days.

(21) Appl. No.: 10/198,459

(22) Filed: Jul. 18, 2002

(65) Prior Publication Data

US 2004/0013203 A1    Jan. 22, 2004

(51) Int. Cl.
*H04L 27/00* (2006.01)
(52) U.S. Cl. .................... 375/259; 375/256
(58) Field of Classification Search ............ 375/130, 375/259, 326, 286, 290, 291, 293, 285, 346, 375/316, 256
See application file for complete search history.

(56) References Cited

U.S. PATENT DOCUMENTS

| | | | |
|---|---|---|---|
| 4,123,710 A * | 10/1978 | Stuart et al. ............ 375/263 |
| 5,517,433 A * | 5/1996 | Morrison ..................... 708/3 |
| 6,148,040 A * | 11/2000 | Nguyen et al. .......... 375/326 |
| 6,341,148 B1 * | 1/2002 | Girardeau, Jr. .......... 375/355 |
| 6,735,238 B1 * | 5/2004 | McCorkle ................ 375/130 |
| 6,847,808 B1 * | 1/2005 | Zhou ...................... 455/189.1 |
| 2001/0035994 A1 * | 11/2001 | Agazzi et al. ............ 359/152 |
| 2003/0169116 A1 * | 9/2003 | Manku et al. ............. 331/57 |
| 2003/0182336 A1 * | 9/2003 | Nielsen et al. .......... 708/300 |
| 2004/0087271 A1 * | 5/2004 | Chang et al. ............ 455/13.3 |
| 2004/0143775 A1 * | 7/2004 | Li et al. ................... 713/401 |
| 2004/0170225 A1 * | 9/2004 | Krause et al. ........... 375/259 |

* cited by examiner

*Primary Examiner*—Tesfaldet Bocure
(74) *Attorney, Agent, or Firm*—Osha Liang LLP (57) ABSTRACT

A method and apparatus for enlarging data eyes in a wireline communication system involves pre-coding a data signal before transmission to generate a constant frequency characteristic independent of a state of the pre-coded data signal. The receiving circuit includes a circuit that temporally expands at least a portion of the pre-coded data signal. The portion of the temporally expanded data signal is latched by the receiving circuit.

34 Claims, 7 Drawing Sheets

TECHNIQUE TO ENLARGE DATA EYES IN WIRELINE COMMUNICATION SYSTEMS

BACKGROUND OF INVENTION

In wireline communication systems, a data signal received at a receiving circuit may have a low voltage potential or a high voltage potential to represent a binary value of zero or one, respectively. A portion of the data signal is transmitted for a duration of time, also known as a bit time. The bit time represents the time during which a single binary value is transmitted. The bit time is inversely proportional to the frequency of the data signal transmission.

The data signal transmission for a bit time has a portion of time in which the binary value is represented by a valid voltage potential. The remaining portion of time is needed for transitions from one voltage potential to another. The portion of time that the binary value is valid is referred to as a data eye.

To increase processor performance, clock frequencies used by microprocessors, often referred to as "CPUs," have increased. Also, as the number of circuits that can be used in a CPU has increased, the number of parallel operations has risen. As processor performance continues to increase, the result has been a larger number of circuits switching at faster rates. Thus, from a design perspective, important considerations, such as switching noise and signal integrity must be taken into account. Signals may have undesirable switching characteristics caused by noise.

As the frequencies of modem computers continue to increase, the need to rapidly transmit data between chip interfaces also increases. To accurately receive the data signal, a clock is often sent to help recover the data signal (also known as source synchronous transmission). The clock determines when the data signal should be latched by a receiver's circuits. As the frequency of the data signal transmission increases, the bit time decreases. Accordingly, the data eye becomes narrower.

Figure 1:
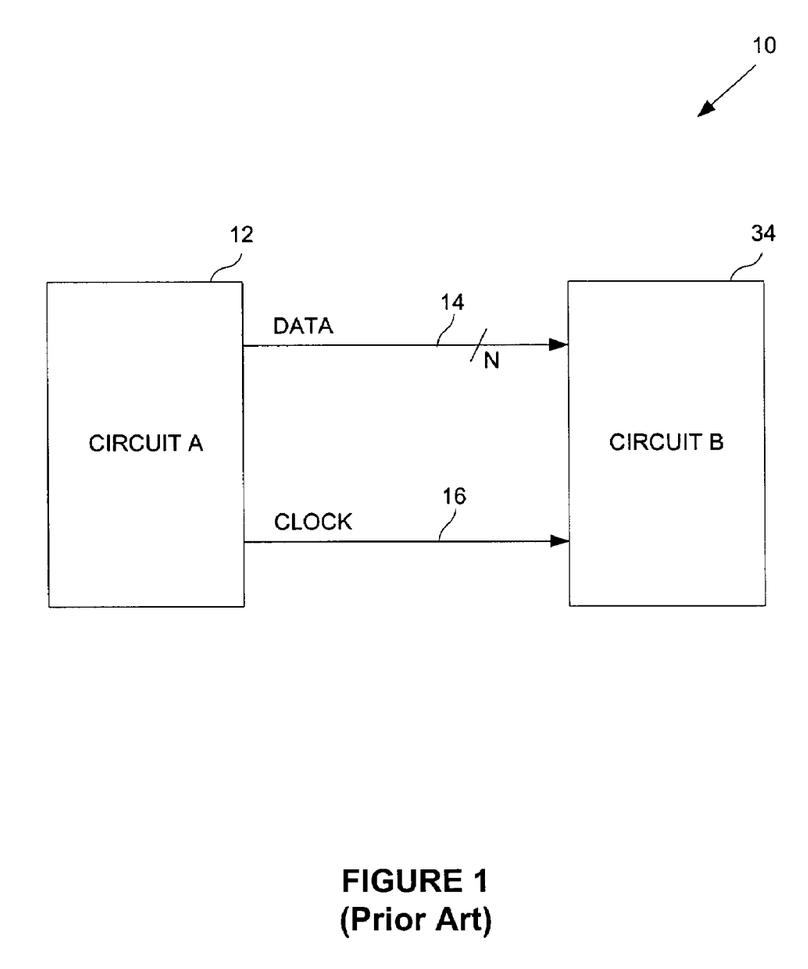
FIG. 1 shows a block diagram of a typical computer system component.

FIG. 1 shows a block diagram of a typical computer system component (10). The computer system (10) includes a link, where the link may include data lines and an associated clock line. Data lines (14) that are N bits wide connect between circuit A (12) and circuit B (34). To aid in the recovery of a transmitted data signal on the data lines (14), a clock signal on the clock line (16) is transmitted with the data signal to determine when the data signal should be latched. Multiple links may connect between circuit A (12) and circuit B (34).

The data signal on the data lines (14) are transmitted from circuit A (12) to circuit B (34). Circuit A (12) and circuit B (34) could also have one or more links to transmit data from circuit B (34) to circuit A (12) including one or more additional clock signals (not shown). Alternatively, the links between circuit A (12) and circuit B (34) could be bi-directional. The decision as to which circuit may transmit at any given time is defined by a protocol.

Figure 2:
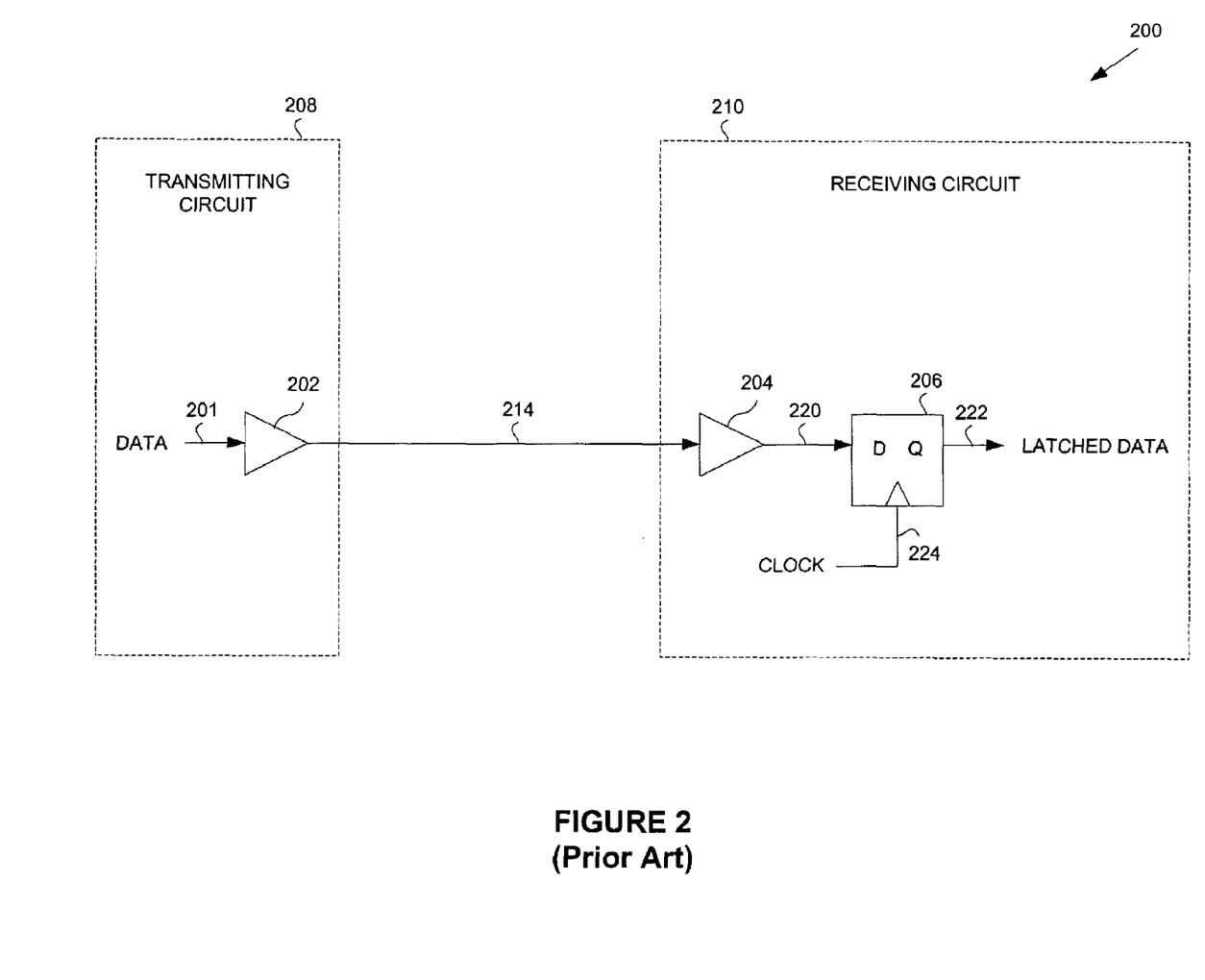
FIG. 2 shows a block diagram of a conventional communication system.

FIG. 2 shows a block diagram of a communication system (200). A data signal (201) is transmitted by an output buffer (202). A transmitting circuit (208) includes the output buffer (202), and generates, or receives, the data signal (201). The transmitted data signal is output onto a data line (214). The transmitted data signal on data line (214) may attenuate during transmission from the transmitting circuit (208) to a receiving circuit (210). An input buffer (204) included in the receiving circuit (210) recovers and regenerates the transmitted data signal to valid voltage potentials.

In FIG. 2, a recovered data signal (220) is input to a latch (206). The latch (206) outputs a copy of the recovered data signal (220) as a latched data signal (222) when a clock signal (224) transitions from a low voltage potential to a high voltage potential. The clock signal (224) is responsive to a clock signal generated by the transmitting circuit (208). The clock signal (224) may be connected directly to the transmitting circuit (208). The clock signal (224) may incur a phase shift as a result of additional circuitry (not shown) included in the receiving circuit (210). The additional circuitry (not shown) may be directly connected to the clock signal generated by the transmitting circuit (208).

Figure 3:
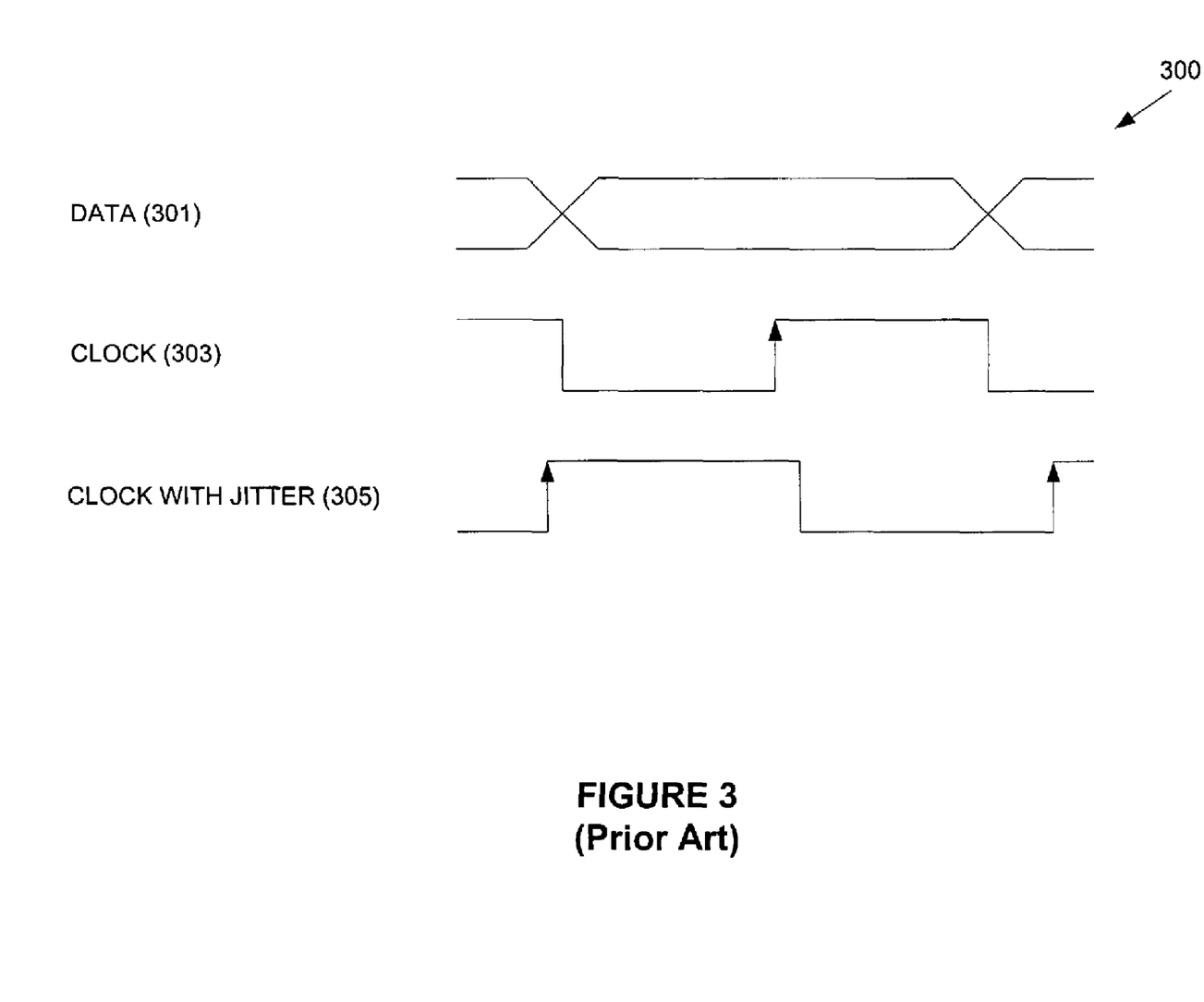
FIG. 3 shows a timing diagram of a conventional communication system.

FIG. 3 shows a timing diagram (300). A data signal (301) is recovered after transmission across a data line. The data signal (301) is input to a latch, for example, latch (206) in FIG. 2. Clock signal (303) causes the data signal (301) to be latched on a low voltage potential to high voltage potential transition of the clock signal (303).

One common signal performance issue is jitter. Jitter is the time domain error from poor spectral purity of a signal. In a repeated signal pattern, such as a clock signal, a transition that occurs from one state to another that does not happen at the same time relative to other transitions is said to have jitter. Jitter represents the perturbations that result in the intermittent shortening or lengthening of signal elements.

In FIG. 3, the clock signal (303) may jitter. The clock signal (303) is shown with added jitter (305). In this example, the clock signal with jitter (305) has enough jitter that the clock transition from a low voltage potential to a high voltage potential does not occur during the bit time. In other words, the clock signal with jitter (305) transitions outside of the data eye.

To properly latch a data signal, the data eye must be wider than the jitter in the clock signal. Jitter in the clock signal limits the frequency of a data signal transmission. One approach has been to use external inductors to help regulate clock generation. However, adding inductors increases a communication system's cost.

SUMMARY OF INVENTION

According to one aspect of the present invention, a communication system comprises a transmitting circuit including a pre-coding circuit that pre-codes a data signal where the transmitting circuit transmits the pre-coded data signal; a link where the link comprises a data line adapted to transmit the pre-coded data signal and a clock line adapted to transmit a clock signal; and a receiving circuit, connected to the link, adapted to input the clock signal and the pre-coded data signal, the receiving circuit comprises a first mixer arranged to temporally expand a first portion of the pre-coded data signal, and a first latch device arranged to latch the temporally expanded first portion of the pre-coded data signal.

According to another aspect of the present invention, a communication system method comprises pre-coding a data signal to obtain the pre-coded data signal; transmitting a clock signal on a clock line and the pre-coded data signal on a data line; receiving the pre-coded data signal; temporally expanding a first portion of the pre-coded data signal; and latching the temporally expanded first portion of the pre-coded data signal.

According to another aspect of the present invention, a communication system comprises means for pre-coding a data signal to obtain the pre-coded data signal; means for transmitting a clock signal on a clock line and the pre-coded data signal on a data line; means for receiving the pre-coded data signal; means for temporally expanding a first portion of the pre-coded data signal; and means for latching the temporally expanded first portion of the pre-coded data signal.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers throughout several figures for consistency.

Embodiments of the present invention relate to a technique for temporally expanding a data eye of a data signal. The data signal is pre-coded before transmission to produce a constant frequency characteristic. After transmission, the pre-coded data signal is mixed with a frequency less than a frequency component of the pre-coded data signal and filtered. The mixing and filtering temporally expands the data eye of the data signal. Moreover, the jitter of a clock signal does not have to be reduced to latch the temporally expanded data signal.

Figure 4:
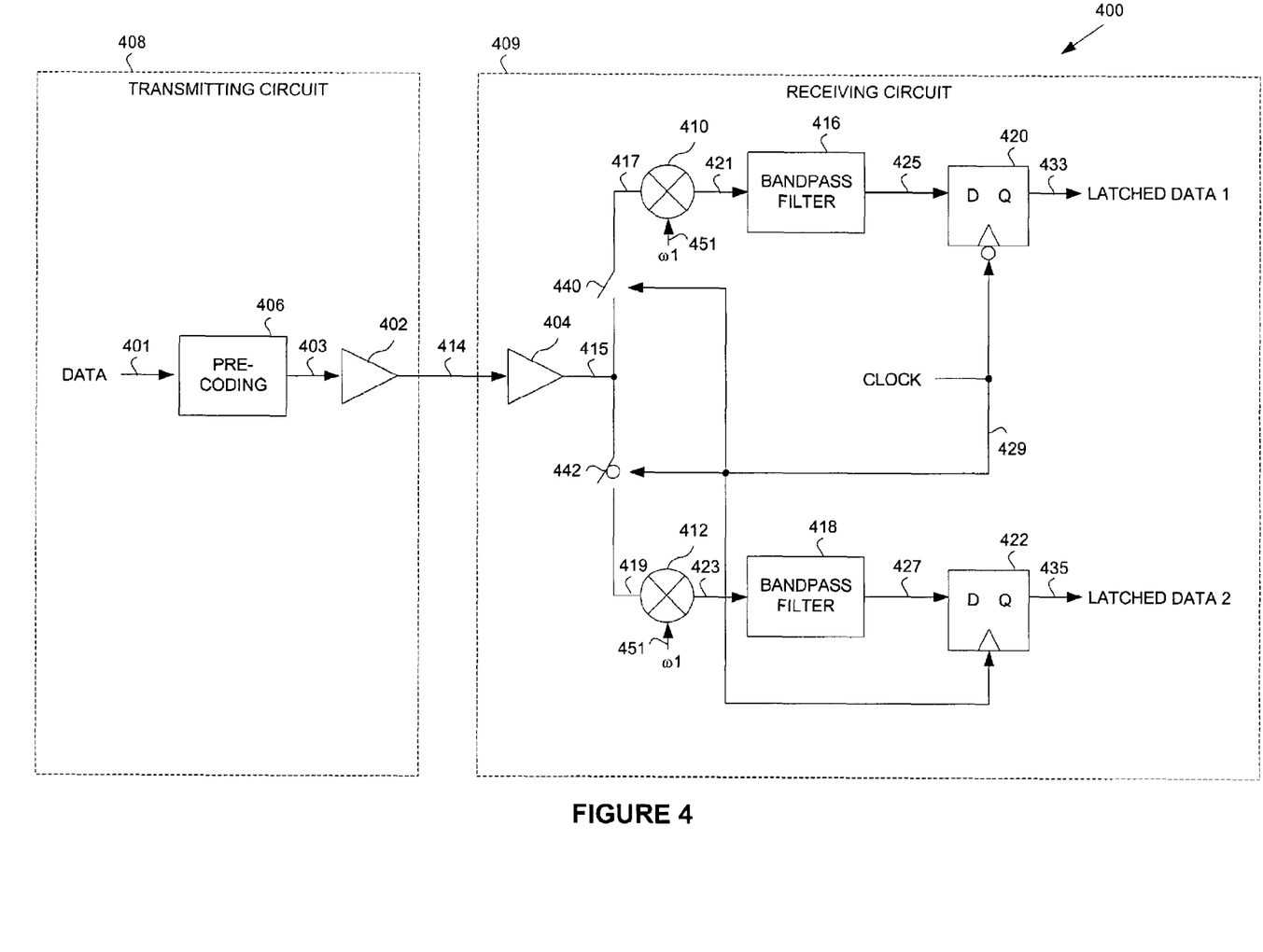
FIG. 4 shows a block diagram of a communication system in accordance with an embodiment of the present invention.

FIG. 4 shows a block diagram of a communication system (400) in accordance with an embodiment of the present invention. The communication system (400) includes a transmitting circuit (408), a receiving circuit (409), and at least one link (only data line (414) is shown as part of the link).

The transmitting circuit (408) and receiving circuit (409) may be on the same integrated circuit. The data line (414) may be a routing line on the integrated circuit. In some embodiments, the transmitting circuit (408) and receiving circuit (409) may be on different integrated circuits. The data line (414) may be a routing line between the transmitting circuit (408) and receiving circuit (409). For example, the data line (414) may be a routing line on a printed circuit board.

A data signal (401) is pre-coded by a pre-coding circuit (406). The pre-coding circuit (406) pre-codes the binary value during a bit time of the data signal (401). For example, a binary value during a bit time of the data signal (401) may be pre-coded into a signal with multiple binary values, that combined, have the same temporal duration as the bit time of the data signal (401). The multiple binary values, regardless of the state of a pre-coded data signal (403), have a constant frequency characteristic.

The pre-coded data signal (403) is transmitted by an output buffer (402). The transmitting circuit (408) includes the pre-coded circuit (406), the output buffer (402), and generates, or receives, the data signal (401). The transmitted, pre-coded data signal is output onto the data line (414). The transmitted, pre-coded data signal on data line (414) may attenuate during transmission from the transmitting circuit (408) to the receiving circuit (409). An input buffer (404) included in the receiving circuit (409) recovers and regenerates the transmitted, pre-coded data signal to valid voltage potentials.

In FIG. 4, a recovered, pre-coded data signal (415) is input to two switches (440, 442). The switch (440), responsive to a clock signal (429), is "on" while the clock signal (429) is at a high voltage potential. The switch (442), also responsive to the clock signal (429), is "on" while the clock signal (429) is at a low voltage potential. Both switches (440, 442) are "off" while the complementary voltage potential is applied to the switches (440, 442).

While switch (440) is "on," the recovered, pre-coded data signal (415) is input to a first mixer (410). The first mixer (410) multiplies a recovered, pre-coded data signal (417) with a mixing frequency $\omega 1$ (451). The mixing frequency $\omega 1$ (451) is less than a frequency of the recovered, pre-coded data signal (417). The multiplication of the of the recovered, pre-coded data signal (417) with the mixing frequency $\omega 1$ (451) produces harmonic and first-order, second-order, third-order, etc., intermodulation components. For example, if the recovered, pre-coded data signal (417) is primarily composed of a signal frequency $\omega 2$, then the multiplication caused by the first mixer (410) produces harmonic components at frequencies $2\omega 1$, $2\omega 2$, $3\omega 1$, $3\omega 2$, etc., and intermodulation components at frequencies $\omega 2-\omega 1$, $2\omega 2-\omega 1$, $2\omega 1-\omega 2$, etc. All of these harmonic and intermodulation components are present in the mixer output signal (421).

Consider the situation in which the intermodulation component of interest is $\omega 2-\omega 1$. A bandpass filter circuit (416) is designed to filter, or remove, the harmonic and intermodulation components that are not equal to the intermodulation component of interest (i.e., $\omega 2-\omega 1$). Only the intermodulation component of interest (i.e., $\omega 2-\omega 1$) is output on signal line (425). Those skilled in the art will note that the bandpass filter circuit (416) could be designed to output on the signal line (425) a different harmonic and/or intermodulation component. In other embodiments, the bandpass filter circuit (416) may be an infinite impulse response filter, a finite impulse response filter, a Butterworth filter, or other analog filter. The signal on signal line (425) is input to a latch (420).

Because the mixing frequency $\omega 1$ (451) has a frequency less than the frequency of the recovered, pre-coded data signal (417), the signal on signal line (425) is temporally expanded compared to the data eye of the data signal (401).

In FIG. 4, the latch (420) outputs a copy of the signal on the signal line (425) as a latched data signal 1 (433) when the clock signal (429) transitions from a high voltage potential to a low voltage potential. The signal on the signal line (425) has a temporally expanded data eye that allows the clock signal (429) transition to more easily occur within the data eye.

Because the signal on the signal line (425) has a temporally expanded data eye, some or all of the following bit times of the data signal (401) may not be output on the signal line (425). A similar circuit architecture as previously described may be designed so that each bit time of the data signal (401) may be expanded. Assuming that the first mixer (410) and the bandpass filter circuit (416) output on the signal line (425) a temporally expanded signal that is twice the bit time of the data signal (401), two circuits that temporally expand the data signal (401) are sufficient.

In FIG. 4, the clock signal (429) is aligned so that it is at a high voltage potential during a first bit time, or first portion, of the data signal (401), and at a low voltage potential during a second bit time, or second portion (adjacent portion), of the data signal (401). The switch (440) is "on" when the first portion of the data signal (401) is available as the recovered, pre-coded data signal (415) at switch (440). Alternately, the switch (442) is "on" when the second portion of the data signal (401) is available as the recovered, pre-coded data signal (415) at switch (442).

While switch (442) is "on," the recovered, pre-coded data signal (415) is input to a second mixer (412). The second mixer (412) multiplies the recovered, pre-coded data signal (419) with a mixing frequency ω1 (451). The mixing frequency ω1 (451) is less than a frequency of the recovered, pre-coded data signal (419). The multiplication of the of the recovered, pre-coded data signal (419) with the mixing frequency ω1 (451) produces harmonic and intermodulation components. All of the harmonic and intermodulation components are present in the mixer output signal (423).

Still considering the situation in which the intermodulation component of interest is ω2−ω1, a bandpass filter circuit (418) is designed to filter, or remove, the harmonic and intermodulation components that are not equal to the intermodulation component of interest (i.e., ω2−ω1). Only the intermodulation component of interest (i.e., ω2−ω1) is output on signal line (427). Those skilled in the art will note that the bandpass filter circuit (418) could be designed to output on the signal line (427) a different harmonic and/or intermodulation component.

In other embodiments, the bandpass filter circuit (418) may be an infinite impulse response filter, a finite impulse response filter, a Butterworth filter, or other analog filter. The signal on signal line (427) is input to a latch (422).

Because the mixing frequency ω1 (451) has a frequency less than the frequency of the recovered, pre-coded data signal (419), the signal on signal line (427) is temporally expanded compared to the data eye of the data signal (401).

The latch (422) outputs a copy of the signal on the signal line (427) as a latched data signal 2 (435) when the clock signal (429) transitions from a low voltage potential to a high voltage potential. The signal on the signal line (427) has a temporally expanded data eye that allows the clock signal (429) transition to more easily occur within the data eye.

One of ordinary skill in the art will understand that temporally expanding the bit time by two is only one possible arrangement. Additional circuits that include a switch, mixer, bandpass filter, and latch may be added to receiving circuit (409) depending on the temporal expansion of the bit time of the data signal (401). For example, if the bit time was expanded to five times its original duration, three additional circuits would be required in addition to the two circuits shown. Also, the switches would require clock signals that were aligned with each of the five bit time durations; and the latches would require clock signals that transition during the temporally expanded signals' data eyes.

One of ordinary skill in the art will appreciate that the mixers (410, 412) can be implemented with a variety of different designs. In an embodiment of the present invention, the mixers (410, 412) may include complementary metal oxide semiconductor transistors. For example, the mixers (410, 412) may be a set of four pass-gate switches, with the switches turned "on" or "off" at the mixing frequency ω1 (451). The pass-gate switches connect the recovered, pre-coded data signal (417, 419) to the mixer output signal (421, 423), respectively, with a gain of positive one during the first half of the mixing frequency ω1 (451) time period, and connect the recovered, pre-coded data signal (417, 419) to the mixer output signal (421, 423), respectively, with a gain of negative one during the second half of the mixing frequency ω1 (451) time period.

One of ordinary skill in the art will appreciate that in some embodiments the mixing frequency ω1 (451) may be generated by the receiving circuit (409). In some embodiments, the mixing frequency ω1 (451) may be generated by a delay locked loop or a phase locked loop responsive to an external or internally generated (i.e., internal to the receiving circuit) clock signal. In some embodiments, a local oscillator may be used by the receiving circuit to generate an internal clock signal. The local oscillator may be implemented by a ring oscillator. A ring oscillator includes circuits that create an odd number of signal inversions. The odd number of inversions cause the ring oscillator to self start and maintain its oscillation.

Figure 5:
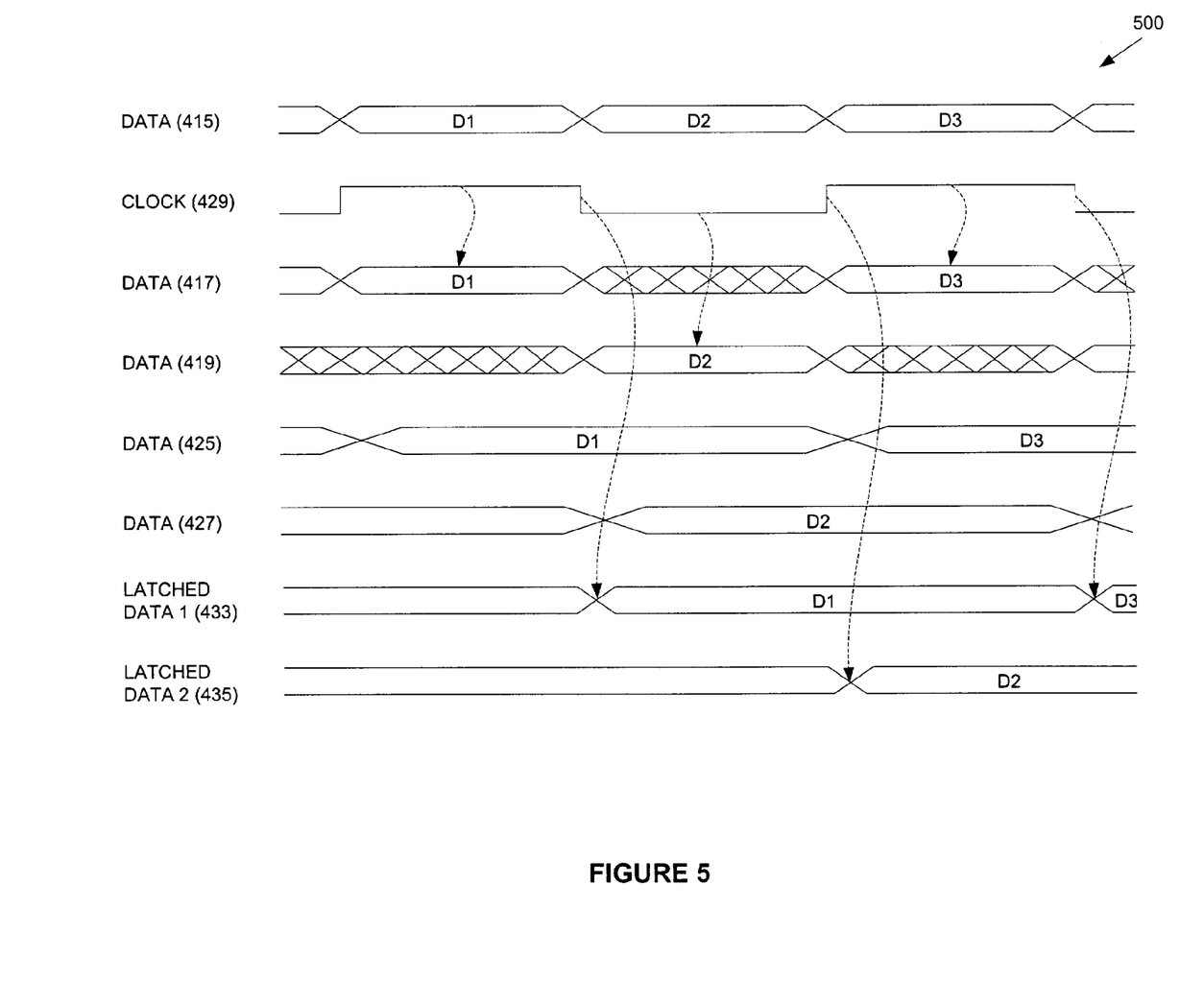
FIG. 5 shows a timing diagram of a communication system in accordance with an embodiment of the present invention.

FIG. 5 shows a timing diagram (500) of a communication system in accordance with an embodiment of the present invention. Three bit times for recovered, pre-coded data signal (415) are shown. The clock signal (429) is aligned with the start of each bit time and determines when the switches (440, 442) connect the recovered, pre-coded data signal (415) to either the recovered, pre-coded data signal (417) or recovered, pre-coded data signal (419). The "X" symbols for the recovered, pre-coded data signals (417, 419) indicate that the data signal is indeterminate during the time indicated.

The recovered, pre-coded data signals (417, 419) are mixed and filtered to produce the signals on signal lines (425, 427), respectively. The mixing and filtering temporally expands the bit time compared to the bit time of the data signal (401) in FIG. 4. In this example, the bit time is doubled. Accordingly, odd numbered data signals are output on signal line (425) and even numbered data signals are output on signal line (427). The temporal expansion of the bit time of the data signal (401) causes the data signal in the adjacent bit time to be removed. The clock signal (429) transitions during the middle of the bit time of the temporally expanded signals on signal lines (425, 427). The clock signal (429) latches the temporally expanded signals on signal lines (425, 427) to produce latched data 1 (433) and latched data 2 (435), respectively.

Figure 6:
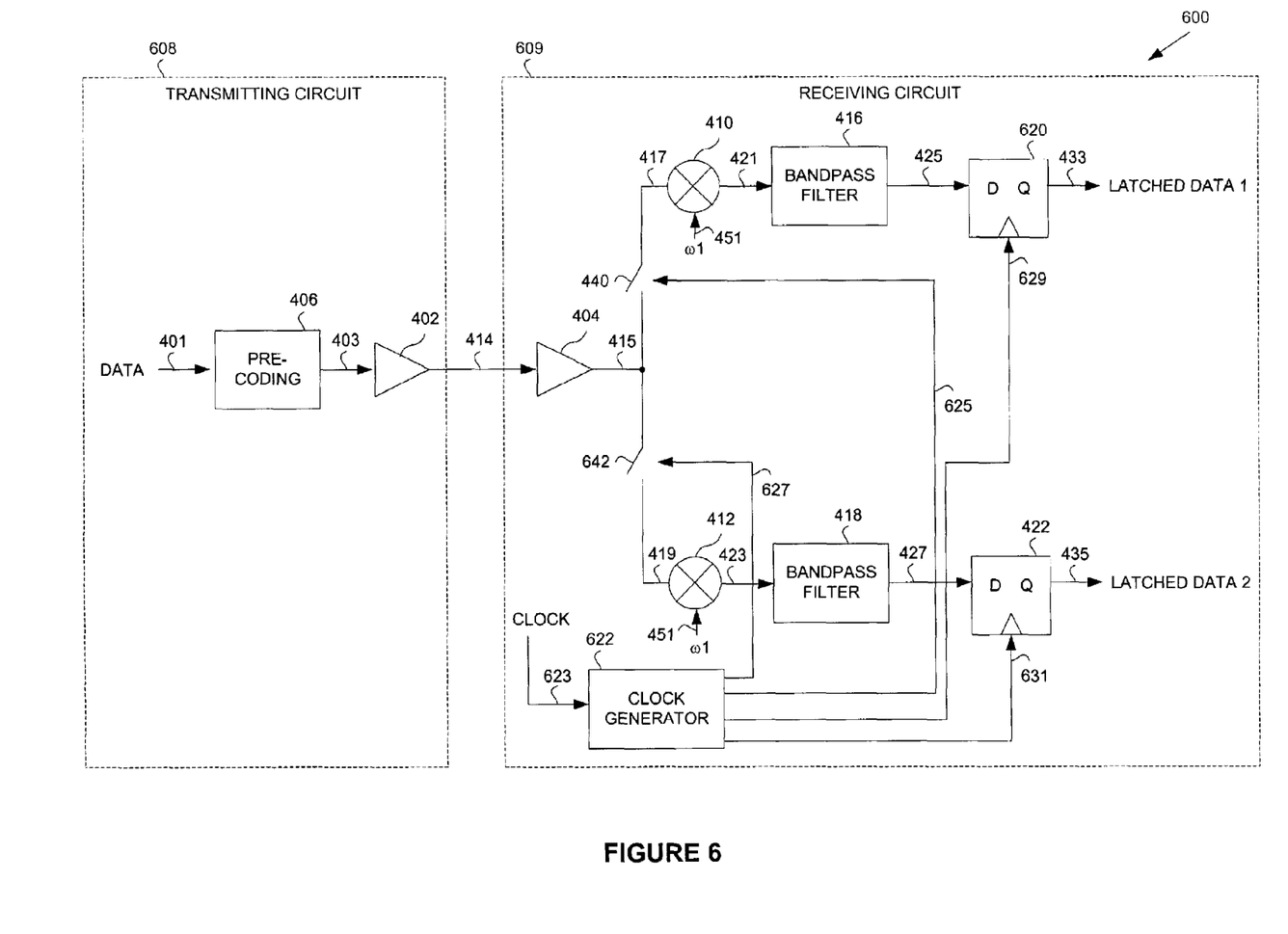
FIG. 6 shows a block diagram of a communication system in accordance with another embodiment of the present invention.

FIG. 6 shows a block diagram of a communication system (600) in accordance with an embodiment of the present invention. In FIG. 6, circuit elements and signals with like numbers to FIG. 4 operate similarly. The communication system (600) includes a transmitting circuit (608), a receiving circuit (609), and at least one link (only data line (414) is shown as part of the link).

The transmitting circuit (608) and receiving circuit (609) may be on the same integrated circuit. The data line (414) may be a routing line on the integrated circuit. In some embodiments, the transmitting circuit (608) and receiving circuit (609) may be on different integrated circuits. The data line (414) may be a routing line between the transmitting circuit (608) and receiving circuit (609). For example, the data line (414) may be a routing line on a printed circuit board.

The transmitting circuit (608) transmits as part of the source synchronous transmission a data signal on data line (414) and a clock signal on a clock line (not shown). The clock line may connect to a clock generator (622) (i.e., a clock signal (623) is responsive to a clock signal on the clock line from the transmitting circuit (608)). Alternatively, the clock signal (623) may be generated by a local oscillator in the receiving circuit (609).

The clock generator (622) generates an appropriately timed clock for the switches (440, 642) and the latches (629, 422). In this embodiment, all the switches (440, 642) and the latches (629, 422) are responsive to a high voltage potential (i.e., positive logic). One of ordinary skill in the art will understand that switches and latches may be used that are responsive to a low voltage potential (i.e., negative logic). The clock signals generated by the clock generator may have to be inverted and/or phase shifted if negative logic circuits are used instead of positive logic circuits.

The clock generator (622) generates clock signals (625, 627) that must be at a high voltage potential during the appropriate bit times. The clock generator (622) generates clock signals (629, 631) that transitions from a low voltage potential to a high voltage potential during the time the temporally expanded signals on signal lines (425, 427), respectively, are at valid voltage potentials.

One of ordinary skill in the art will appreciate that the clock generator (622) may generate the clock signals (625, 627, 629, 631) using combinational logic responsive to the clock signal (623). The clock generator (622) may include a delay locked loop or a phase locked loop. The timing of the transitions of the clock signals (625, 627, 629, 631) may be adjusted individually or in groups to optimize the timing of the transitions. Optimization of the timing of the transitions of the clock signals (625, 627, 629, 631) may occur with respect to the bit times (i.e., data eye duration) of the data signals associated with their respective switches (440, 642) and latches (620, 422).

Figure 7:
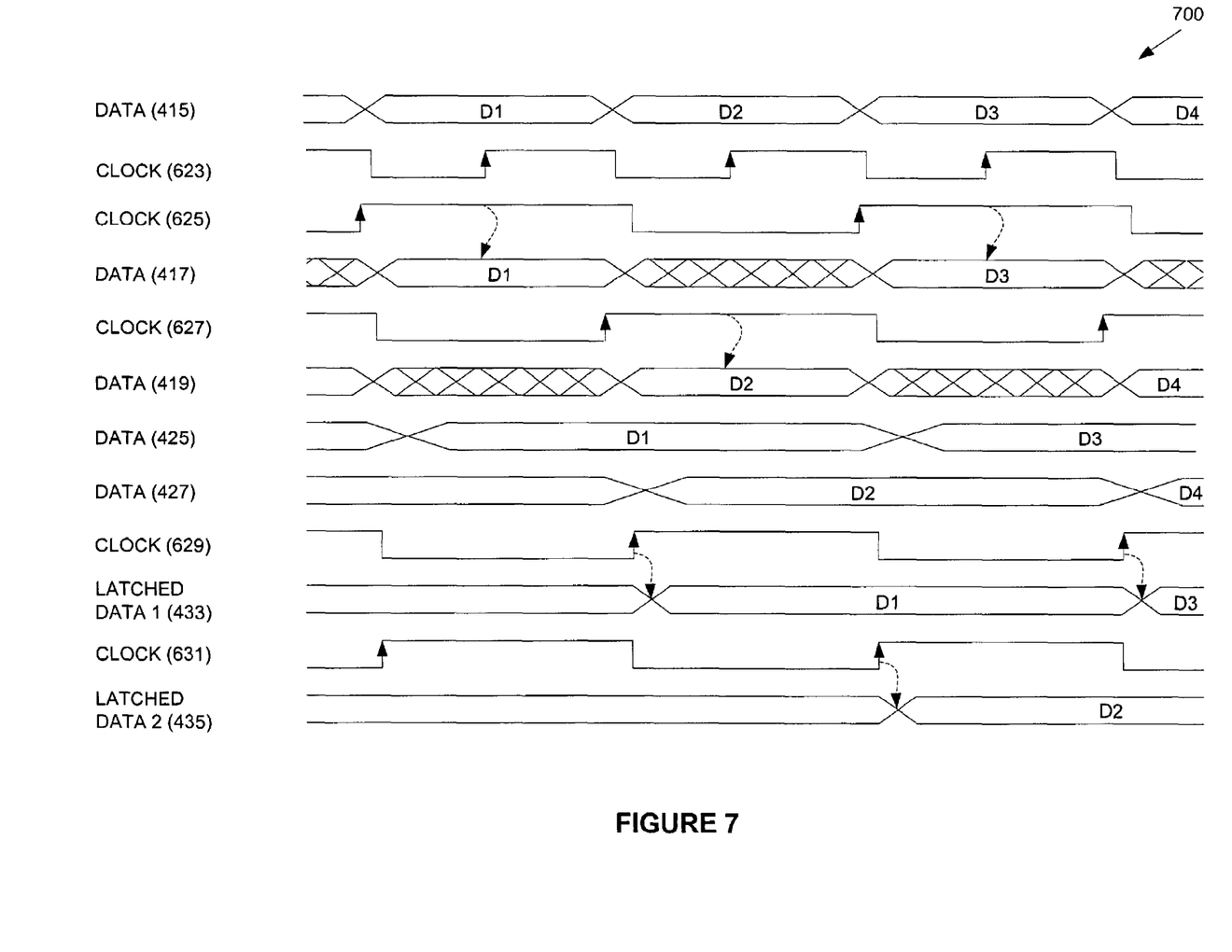
FIG. 7 shows a timing diagram of a communication system in accordance with another embodiment of the present invention.

FIG. 7 shows a timing diagram (700) of a communication system in accordance with an embodiment of the present invention. Three full bit times and a partial bit time for recovered, pre-coded data signal (415) are shown. The clock signal (623) has a low voltage potential to high voltage potential transition during each bit time. The clock signal (623) is the input to the clock generator circuit (622) shown in FIG. 6.

The clock signal (625) is aligned slightly before the start of odd numbered bit times and determines when the switch (440) connects the recovered, pre-coded data signal (415) to the recovered, pre-coded data signal (417). The clock signal (627) is aligned slightly before the start of even numbered bit times and determines when the switch (440) connects the recovered, pre-coded data signal (415) to the recovered, pre-coded data signal (417). Because clock signal (625) and clock signal (627) are separate clock signals, they may have a duration that complete encompasses the bit time and may not be complements of each other.

The recovered, pre-coded data signals (417, 419) are mixed and filtered to produce the signals on signal lines (425, 427), respectively. The mixing and filtering temporally expands the bit time compared to the bit time of the data signal (401) in FIG. 6. In this example, the bit time is doubled. The clock signal (629) transitions from a low voltage potential to a high voltage potential during the middle of the bit time of the temporally expanded signal on signal line (425). The clock signal (629) latches the temporally expanded signal on signal lines (425) to produce latched data 1 (433). The clock signal (631) transitions from a low voltage potential to a high voltage potential during the middle of the bit time of the temporally expanded signal on signal line (427). The clock signal (631) latches the temporally expanded signal on signal lines (427) to produce latched data 2 (435). Clock signals (629, 631) are complements of each other; however, the transitions of clock signals (629, 631) may advantageously be adjusted independently of each other.

Advantages of the present invention may include one or more of the following. In one or more embodiments, because a data signal is temporally expanded, jitter in a clock signal may not have to be reduced. The reduction of jitter in a clock signal may increase the complexity, cost, number of components, and design time of the transmitting and/or receiving circuit.

In one or more embodiments, because a data signal is temporally expanded, the probability of transmission bit error due to jitter in a clock signal is reduced.

In one or more embodiments, a single clock signal controls the duration that switches are "on" and when latches output the next bit time of the data signal. This arrangement reduces the number of clock signals generated.

In one or more embodiments, multiple clock signals control the duration that switches are "on" and when latches output the next bit time of the data signal. This arrangement provides greater flexibility and enables non-complementary clock signals.

In one or more embodiments, the amount of temporal expansion of a data signal may be controlled. Accordingly, the amount of temporal expansion may be matched with the number of temporal expansion circuits. Switches are used to properly select during which bit time the recovered, pre-coded data signal (415) in FIG. 4 and FIG. 6 is connected to each temporal expansion circuit.

In one or more embodiments, a pre-coding circuit (406) in FIG. 4 and FIG. 6 is used to modify the data signal (401) in FIG. 4 and FIG. 6 to maintain a constant frequency characteristic independent of a state of the pre-coded data signal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A communication system, comprising:
   a transmitting circuit comprising a pre-coding circuit that pre-codes a data signal, wherein the transmitting circuit transmits a pre-coded data signal;
   a link, wherein the link comprises a data line adapted to transmit the pre-coded data signal and a clock line adapted to transmit a clock signal; and
   a receiving circuit, connected to the link, adapted to input the clock signal and the pre-coded data signal, the receiving circuit comprising:
   a first mixer arranged to temporally expand a first portion of the pre-coded data signal by mixing the first portion of the pre-coded data signal with a mixer frequency, wherein the mixer frequency is less than a frequency of the pre-coded data signal, and
   a first latch device arranged to latch the temporally expanded first portion of the pre-coded data signal.

2. The communication system of claim 1, wherein the pre-coding circuit generates a constant frequency characteristic independent of a state of the pre-coded data signal.

3. The communication system of claim 1, the receiving circuit further comprising:
   a first switch responsive to a first signal wherein the first portion of the pre-coded data signal is dependent on the first switch.

4. The communication system of claim 1, wherein the first latch device is responsive to a first clock.

5. The communication system of claim 1, wherein the first mixer comprises metal oxide semiconductor devices.

6. The communication system of claim 1, wherein the data line is bi-directional.

7. The communication system of claim 1, wherein the data line is unidirectional.

8. The communication system of claim 1, the receiving circuit further comprising:
a first bandpass filter that filters an output of the first mixer.

9. The communication system of claim 8, wherein the first bandpass filter generates a first filtered data signal and wherein the first filtered data signal has a data eye that is wider than a jitter of the clock signal.

10. The communication system of claim 1, wherein the mixer frequency is determined by the receiving circuit.

11. The communication system of claim 1, wherein the mixer frequency is generated by a ring oscillator.

12. The communication system of claim 1, further comprising:
a second mixer arranged to temporally expand a second portion of the pre-coded data signal, and
a second latch device arranged to latch the temporally expanded second portion of the pre-coded data signal.

13. The communication system of claim 12, the receiving circuit further comprising:
a second switch responsive to a second signal wherein the second portion of the pre-coded data signal is dependent on the second switch.

14. The communication system of claim 12, wherein the second latch device is responsive to a second clock.

15. The communication system of claim 12, the receiving circuit further comprising:
a second bandpass filter that filters an output of the second mixer.

16. The communication system of claim 15, wherein the second bandpass filter generates a second filtered data signal and wherein the second filtered data signal has a data eye that is wider than a jitter of the clock signal.

17. A method for performing communication system operations, comprising:
pre-coding a data signal to obtain a pre-coded data signal;
transmitting a clock signal on a clock line and the pre-coded data signal on a data line;
receiving the pre-coded data signal;
temporally expanding a first portion of the pre-coded data signal by mixing the first portion of the pre-coded data signal with a first frequency, wherein the first frequency is less than a frequency of the pre-coded data signal; and
latching the temporally expanded first portion of the pre-coded data signal.

18. The method of claim 17, wherein the pre-coding produces a constant frequency characteristic for the pre-coded data signal independent of a state of the pre-coded data signal.

19. The method of claim 17, wherein the temporally expanding the first portion of the pre-coded data signal comprises a first mixer.

20. The method of claim 19, further comprising:
transferring the first portion of the pre-coded data signal to the first mixer.

21. The method of claim 17, wherein the latching the temporally expanded first portion of the pre-coded data signal is responsive to a first clock.

22. The method of claim 17, wherein the temporally expanding the first portion of the pre-coded data signal comprises metal oxide semiconductor devices.

23. The method of claim 17, wherein the data line is bi-directional.

24. The method of claim 17, wherein the data line is unidirectional.

25. The method of claim 17, wherein the temporally expanding the first portion of the pre-coded data signal comprises filtering.

26. The method of claim 25, wherein the filtering generates a first filtered data signal and wherein the first filtered data signal has a data eye that is wider than a jitter of the clock signal.

27. The method of claim 17, wherein the first frequency is generated by a ring oscillator.

28. The method of claim 17, further comprising:
temporally expanding a second portion of the pre-coded data signal; and
latching the temporally expanded second portion of the pre-coded data signal.

29. The method of claim 28, wherein temporally expanding the second portion of the pre-coded data signal comprises a second mixer.

30. The method of claim 29, further comprising:
transferring the second portion of the pre-coded data signal to the second mixer.

31. The method of claim 28, wherein the latching the temporally expanded second portion of the pre-coded data signal is responsive to a second clock.

32. The method of claim 28, wherein the temporally expanding the second portion of the pre-coded data signal comprises filtering.

33. The method of claim 32, wherein the filtering generates a second filtered data signal and wherein the second filtered data signal has a data eye that is wider than a jitter of the clock signal.

34. A communication system, comprising:
means for pre-coding a data signal to obtain a pre-coded data signal;
means for transmitting a clock signal on a clock line and the pre-coded data signal on a data line;
means for receiving the pre-coded data signal;
means for temporally expanding a first portion of the pre-coded data signal by mixing the first portion of the pre-coded data signal with a mixer frequency, wherein the mixer frequency is less than a frequency of the pre-coded data signal; and
means for latching the temporally expanded first portion of the pre-coded data signal.

* * * * *